United States Patent [19]

Raasch

[11] Patent Number: 5,638,670
[45] Date of Patent: Jun. 17, 1997

[54] OPEN-END SPINNING APPARATUS

[75] Inventor: Hans Raasch, Mönchengladbach, Germany

[73] Assignee: W. Schlafhorst AG & Co., Moenchengladbach, Germany

[21] Appl. No.: 396,660

[22] Filed: Mar. 1, 1995

[30] Foreign Application Priority Data

Mar. 19, 1994 [DE] Germany .......................... 44 09 476.0

[51] Int. Cl.⁶ .............................. D01H 4/00; D01H 13/00
[52] U.S. Cl. ..................... 57/406; 57/102; 57/407
[58] Field of Search .......................... 57/407, 408, 102; 74/458, 425

[56] References Cited

U.S. PATENT DOCUMENTS

| 4,739,671 | 4/1988 | Nelson | 74/425 |
| 5,433,068 | 7/1995 | Stahlecker | 57/407 |

FOREIGN PATENT DOCUMENTS

| 1053269 | 8/1959 | Germany . |
| 2314229 | 1/1976 | Germany . |
| 2155556 | 1/1985 | Germany . |
| 4323213 | 7/1993 | Germany . |
| 4323213 A1 | 1/1995 | Germany . |

*Primary Examiner*—William Stryjewski
*Attorney, Agent, or Firm*—Herbert L. Lerner; Laurence A. Greenberg

[57] ABSTRACT

An open-end spinning apparatus in a spinning machine for continuous spinning of textile fibers includes a spinning rotor having an axis. A cap covers the spinning rotor and is pivotably supported about a pivot axis oriented at right angles to the rotor axis. Delivery and opening devices are disposed in the cap for supplying textile fibers to the spinning rotor. A stationarily installed shaft extends longitudinally of the spinning machine for driving a multiplicity of opening devices. A worm transmission drives at least the opening device and has a driving worm on the stationarily installed shaft and a worm wheel with teeth on a drive shaft of the opening device. The worm wheel meshes with and plunges into the driving worm upon closure of the cap. The driving worm includes at least one thread having adjacent windings with end surfaces and with lateral surfaces having an additional shaping tapering the end surfaces to a point. Two of the adjacent windings have tips being spaced apart by a spacing being great enough to cause at least one of the teeth of the worm wheel to be forced between two of the windings upon plunging into the driving worm.

6 Claims, 4 Drawing Sheets

OPEN-END SPINNING APPARATUS

BACKGROUND OF THE INVENTION

Field of the Invention

The invention relates to an open-end spinning apparatus in a spinning machine for continuous spinning of textile fibers being supplied to a spinning rotor through a respective delivery and opening device, the delivery and opening devices being disposed in a pivotably supported cap covering the spinning rotor, a pivot pin of the cap being oriented at right angles to the rotor axis, a shaft being installed in stationary fashion and extending longitudinally of the spinning machine for driving a multiplicity of opening devices, the opening device carrying a worm wheel on its drive shaft, and the worm wheel meshing with a worm mounted on the shaft being installed in stationary fashion when the cap is closed.

In open-end spinning apparatuses, as a rule both the delivery and the opening devices are accommodated in a cap located in front of the respective spinning means. This cap is hinged at a pivot pin and can be raised, making the spinning means accessible. However, raising it also makes the delivery device for the sliver and the opening device, that is, the opening roller, accessible as well. The corresponding devices can easily be cleaned and replaced by opening the hinged cap. That kind of device is known, for instance, (not prior art), from German Published, Prosecuted Application DE-AS 23 14 229.

In contrast to textile machines with an individual drive, open-end spinning apparatuses as a rule have drives that drive all of the identical working means in the respective spinning stations jointly. That is true, for instance, for sliver draw-in rollers and for openings devices. The drive shaft for the draw-in rollers extends through the entire machine and there is a worm at each spinning station that drives a worm wheel having a shaft on which the draw-in roller is seated. If the cap of a spinning station is opened, the worm wheel swivels out of the particular worm that drives it and is thus disconnected from the drive.

If the cap is closed again and the worm wheel that drives the opening roller of the draw-in device is to be put back into engagement with the worm again, then the teeth may not mesh because the tooth tips are jammed together. Given the usual gear ratios of a worm gear for driving an draw-in roller, which range from 1:15 to 1:30, the pitch dimension measured along the tips of the worm wheel at the tip circle is greater than the pitch dimension of the worm. This is because the pitch of a worm and the pitch measured at the pitch circle diameter of the worm wheel are the same, but the pitch measured along the larger tip circle diameter of the worm wheel is greater. As a result, when the worm wheel plunges into the worm, especially if there is an unfavorable gear ratio, a situation can arise where two teeth of the worm wheel contact the thread or two teeth or threads of the worm, or overlap them and become wedged. In those positions, even if the worm revolves, full engagement does not occur.

German Published, Prosecuted Application DE-AS 23 14 229 therefore discloses a special embodiment of the worm wheel. Moreover, the pivot point for the cap is located in such a way that the worm wheel pivots at a tangent into the worm. By constructing the teeth specially and by providing an elastic peripheral zone for the teeth, damage to the driving wheel is averted.

However, it is logical to construct the drive wheel in that way only if a tangential introduction of the drive wheel into the worm is possible.

However, for structural reasons it is not always possible to place the cap in such a way as to enable tangential introduction of the worm wheel into the worm, and therefore it is usual to provide for the conventional vertical or virtually vertical plunging of the drive wheel into the worm. That kind of vertical or virtually vertical plunging of the drive wheel into the driving worm is known from German Published, Non-Prosecuted Application DE 43 23 213 A1, corresponding to U.S. application Ser. No. 08/273,861, filed Jul. 12, 1994.

SUMMARY OF THE INVENTION

It is accordingly an object of the invention to provide an open-end spinning apparatus, which overcomes the hereinafore-mentioned disadvantages of the heretofore-known devices of this general type and that has a worm gear in which plunging of the worm wheel into the worm is possible without hindrance.

With the foregoing and other objects in view there is provided, in accordance with the invention, an open-end spinning apparatus in a spinning machine for continuous spinning of textile fibers, comprising a spinning rotor having an axis; a cap covering the spinning rotor and being pivotably supported about a pivot axis oriented at right angles to the rotor axis; a delivery roller disposed in the cap for supplying textile fibers to the spinning rotor, the roller having a drive shaft; a stationarily installed shaft extending longitudinally of the spinning machine for driving the roller; a worm transmission driving the roller and having a driving worm on the stationarily installed shaft and a worm wheel with teeth on the drive shaft, the worm wheel meshing with and plunging into the driving worm upon closure of the cap; the driving worm including a thread or threads in the case of multi-thread worms, having adjacent windings with end surfaces and with lateral surfaces having an additional shaping tapering the end surfaces to a point; and two of the adjacent windings having tips being spaced apart by a spacing being great enough to cause at least one of the teeth of the worm wheel to be forced between two of the windings upon plunging into the driving worm.

In accordance with another feature of the invention, the spacing between the tips of two adjacent windings of the at least one worm thread is selected to be at most as great as the spacing between two tips of the teeth of the worm wheel on its tip circle.

If the spacing of the tips is greater, then two teeth can slip in between two adjacent worm windings at the same time, causing the worm wheel to jam. However, the tip spacing must not be chosen to be substantially smaller than the spacing between two tooth tips of the worm wheel, because otherwise two adjacent worm windings could become jammed between two worm wheel teeth. Preferably, the spacing of two tips of adjacent worm windings is chosen to be as great as the spacing between two tooth tips of the worm wheel on its tip circle.

This embodiment of the worm thread or threads advantageously forces the teeth of the plunging worm wheel, in any position, to slide along the tooth flanks or lateral surfaces of the worm, thus causing forced rotation of either the worm or the worm wheel and therefore leading to an ordered plunging of the teeth of the worm wheel between two adjacent thread windings. The embodiment of the lateral surfaces or flanks of two adjacent windings of the worm thread or threads in accordance with the invention accordingly prevents two adjacent worm wheel teeth from fitting over two thread windings and prevents contact of the tooth tips of the worm wheel with the tips of the thread windings, and therefore prevents blockage of the closure of the cap.

This is especially true when, in accordance with a further feature of the invention, the worm wheel plunges vertically or virtually vertically into the worm.

In accordance with an added feature of the invention, a profile of the tooth tip or tips of the worm is superimposed on a toothing profile of the worm, and the pitch of the superimposed profile in each case matches the tip spacing of the worm wheel.

In accordance with an additional feature of the invention, the profile is superimposed on the toothing profile of the worm in a shifted manner, in such a way that the thread winding in the middle of the worm comes to have a symmetrical tip, and the adjacent thread winding or worm threads have an asymmetrical tip in mirror images of one another. The superimposed profile is made maximally as wide as the extent of the operating rolling circle of the worm. For instance, the superimposed profile in the tooth tip can include an angle of 110°. Due to the differing pitches of the worm threads and of the profile, the latter being oriented to the spacing of the tooth tips of the worm wheel, the result is a differing embodiment of the lateral surfaces or flanks of the worm thread or threads. In order to facilitate the vertical or nearly vertical plunging of the worm wheel into the worm, the worm thread is constructed symmetrically in the center of the worm, while the adjacent tips of the thread windings or of the other worm threads are beveled increasingly asymmetrically as the distance from the worm thread in the center of the thread increases. Regardless of the position in which the teeth of the worm wheel plunge into the worm, the tooth tips of the worm wheel always meet the beveled tooth flanks or lateral surfaces of the worm teeth. The worm wheel tooth tip that arrives upon a tooth flank or lateral surface first slips along the profile of the toothing of the tooth tips according to the invention, and as a result the worm wheel, being the more easily movable part, rotates until such time as the teeth are in engagement with at least one worm thread.

The windings coming to an end toward the respective end of the worm symmetrically have a decreasing tip circle diameter.

This facilitates the plunging of the worm wheel, in particular into a worm that is already rotating.

In accordance with yet another feature of the invention, the driving worm has a center line, and the profile of the additional shaping has profile surfaces enclosing an angle between two of the profile surfaces being symmetrical with respect to the center line of the driving worm.

In accordance with a concomitant feature of the invention, in the center portion of the worm, where the worm wheel teeth mesh, it is assured that the load-bearing profile of the thread windings will be large enough because the profile of the tooth flanks or lateral surfaces is removed at most up to the operating rolling circle of the worm.

Other features which are considered as characteristic for the invention are set forth in the appended claims.

Although the invention is illustrated and described herein as embodied in an open-end spinning apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
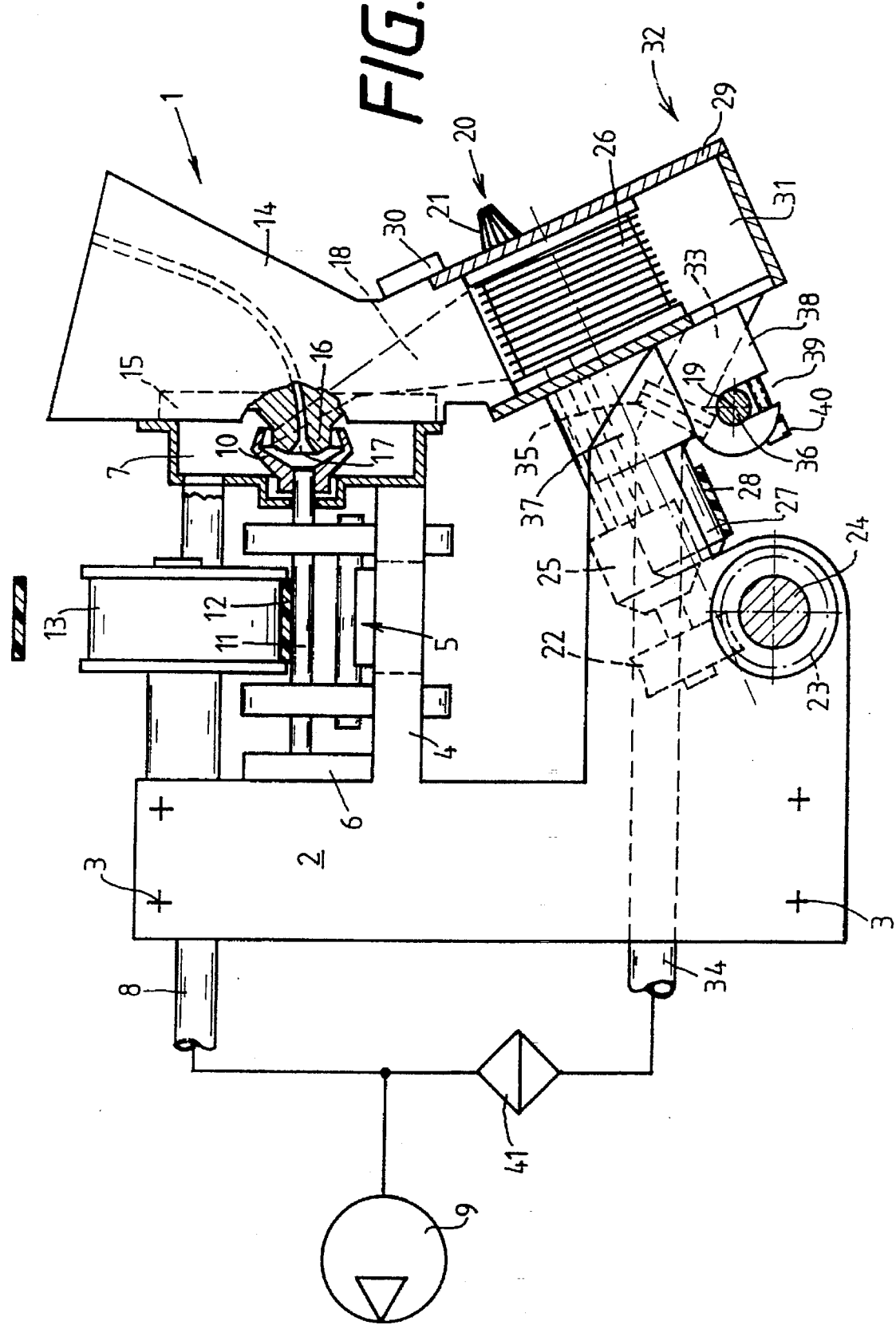
FIG. 1 is a fragmentary, diagrammatic, partly broken-away and partly sectional side-elevational view of a spinning station of a rotor spinning machine in a closed state.
Figure 2:
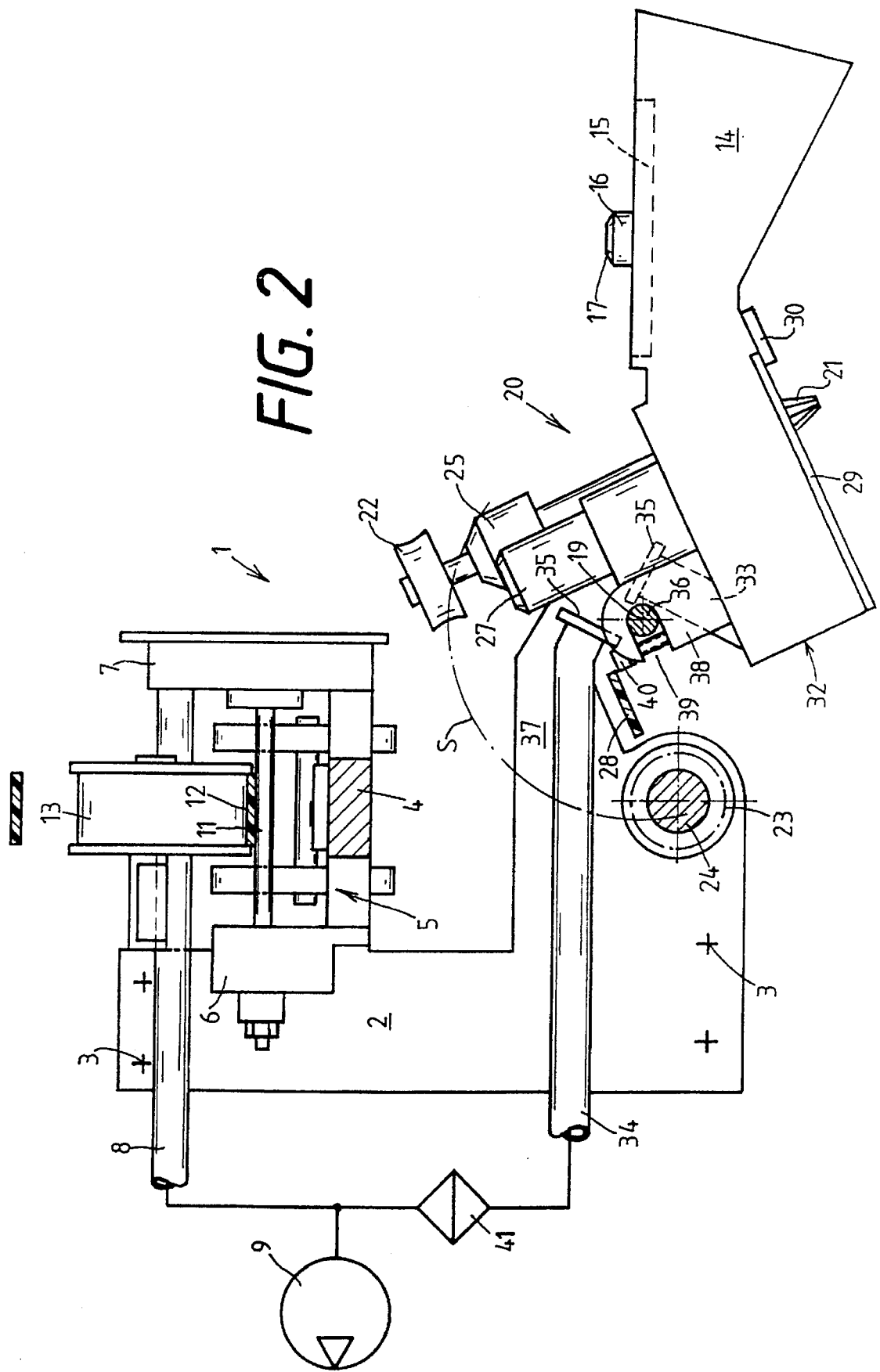
FIG. 2 is a view similar to FIG. 1 of the same spinning station with a cap hinged open.

Referring now to the figures of the drawing in detail and first, particularly, to FIGS. 1 and 2 thereof, there is seen an open-end spinning apparatus. Only characteristics contributing to a comprehension of the invention will be shown and described. The present exemplary embodiment shows a rotor spinning apparatus 1 as the open-end spinning apparatus. Many such spinning apparatuses, disposed side by side, form work stations of a rotor spinning machine known from the prior art.

As can be seen in FIGS. 1 and 2, the rotor spinning apparatuses 1 have a support frame 4, which is secured through walls of a spinning box 2 and through corresponding fastening elements 3 to a non-illustrated base frame of the machine. Disposed on this support frame 4 are a support disk bearing 5, a thrust bearing 6 and a rotor housing 7 which is connected through a suction line 8 to a negative pressure source 9. A spinning rotor 10 which revolves in the rotor housing 7 has a rotor shaft 11 that is supported in a wedge-like gap between two support disk pairs of the support disk bearing 5. In a manner which is known from the prior art, the rotor shaft 11 is acted upon by a lower run of a tangential belt 12, which is caused to contact the rotor shaft 11 by means of a pressure roller 13.

The rotor housing 7 is open at the front and is sealed off by a conduit plate 15 secured in a cap 14. The conduit plate 15 has a centrally disposed protrusion 16, protruding toward the front past the conduit plate 15. Disposed in the protrusion 16 are a yarn draw-off nozzle 17 and an orifice region of a fiber guide conduit 18.

The cap 14 is movably supported on a pivot pin 19 having a pivot axis and besides the conduit plate 15, it also has devices 20 for delivering and opening sliver. The one-piece fiber guide conduit 18, an opening roller 26 and a sliver introduction roller 21, are all accommodated in the cap 14. The sliver introduction roller 21 is driven through a worm wheel 22 that is in engagement with a worm 23 of a drive shaft 24 extending longitudinally of the machine and can be actuated in a defined manner through an electric coupling 25. A wharve 27 at the opening roller 26 is driven by a run of a tangential belt 28.

An opening roller housing, along with a dirt chamber 31 disposed below the opening roller 26, is closable by a cap 29 which is secured by a locking bar 30. The dirt chamber 31 disposed under the opening roller 26 is part of a single dirt separator 32 and is connected through a connection nozzle 33 at the rear to a dirt suction line 34, which in turn communicates through a filter chamber 41 with the negative pressure source 9. A coupling region 35 of these two elements 33, 34 is located just above the pivot pin 19 when the spinning box is closed, as is shown in FIG. 1.

The pivot pin 19, about which the cap element 14 is tiltably supported as is suggested in FIG. 2, is preferably constructed as short bolts 36, which are disposed in forward-projecting outriggers 37 of walls of the spinning box 2. The bolts 36 are supported in slit-like recesses 39 which are disposed in fastening tabs 38 of the cap 14. The bolts 36, that are rotatably retained in the slit-like recesses 39, are secured by securing means 40, which in the present case are in the form of a clamping screw.

FIG. 1 shows the condition of the spinning apparatus 1 with the cap 14 closed. The worm wheel 22, which drives the introduction roller 21 in a manner that cannot be seen in this case, is in engagement with the worm 23. The wharve 27 which drives the opening roller 26 rests on the belt 28.

FIG. 2 shows the spinning apparatus 1 with the cap 14 hinged upward. The cap 14, with the fixtures disposed on it, has been pivoted about the pivot pin 19 for this purpose. In the process, the wharve 27 has lifted away from the belt 28, and the worm wheel 22 has been lifted out of the worm 23. It has pivoted into the illustrated position over a path S as indicated. In this position, the coupling 25 is open, and the worm wheel 22 is not coupled to the introduction roller 21, which is concealed in this view.

Figure 3:
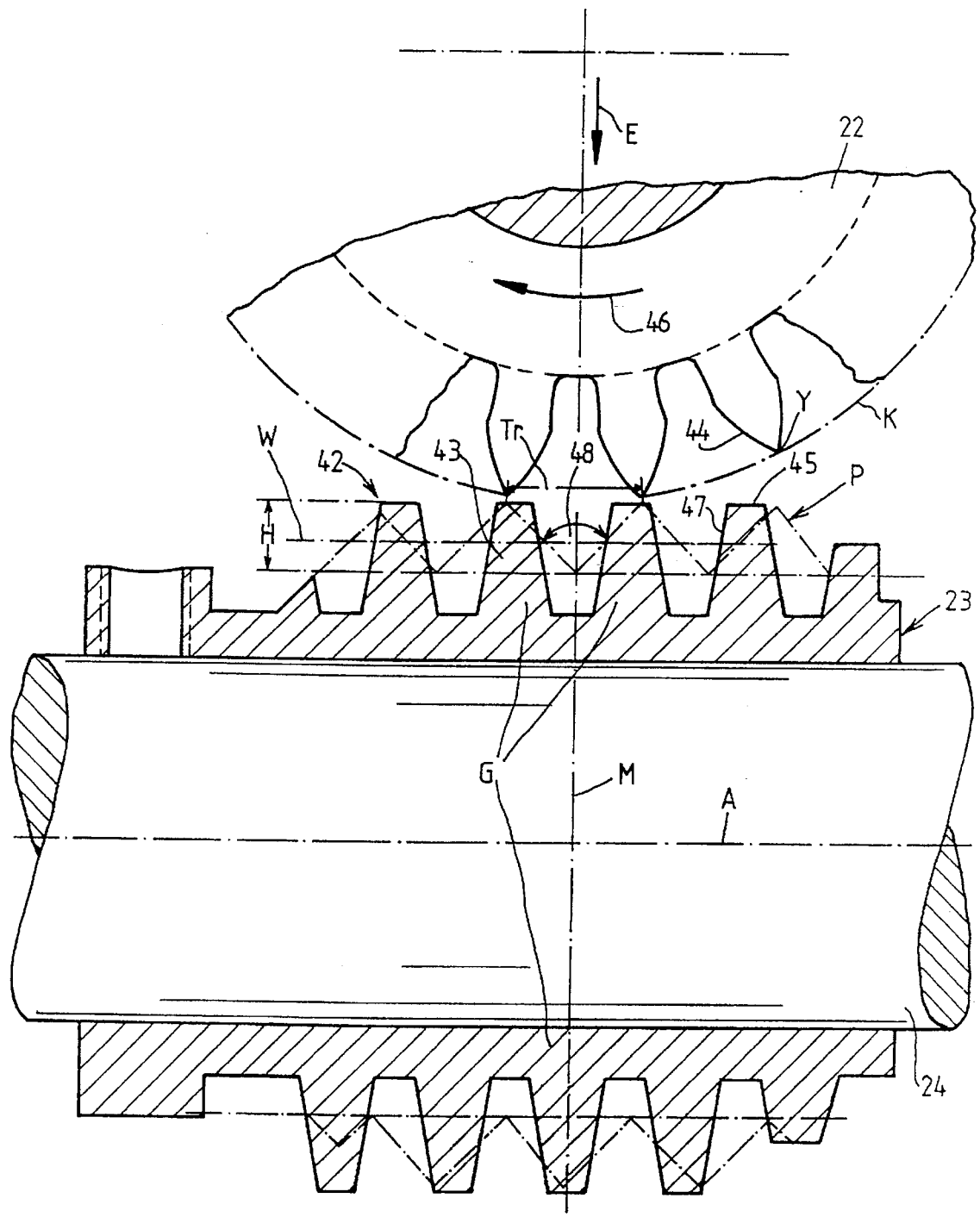
FIG. 3 is an enlarged, fragmentary, partly sectional front-elevational view of a portion of the spinning station showing a situation in which worm threads are jammed, as can occur with a conventional toothing profile of the worm.

FIG. 3 shows a condition in which the worm wheel 22 assumes such a position, when the cap 14 is hinged closed, that its teeth 44 cannot engage a thread or threads 42 of the worm 23 in the direction of an arrow E. In order to make the invention simpler to explain, it is assumed that the illustrated worm 23 has a single thread 42. A section is shown through the worm thread 42 in such a way that the contour of the various windings 43 of the thread 42 become visible. As can be seen from the drawing, tips Y of the teeth 44 of the worm wheel 22 contact end surfaces 45 of the windings 43 of the worm thread 42. If the worm wheel 22 is driven in a direction of rotation 46 in the present exemplary embodiment, it cannot enter into engagement with the worm 23. Since the drive shaft 24, on which the worm 23 is mounted, rotates continuously, the worm 23 rotates as well while the cap 14 is being closed. As a rule, upon contact of the worm wheel 22 with the worm 23, engagement will occur, but when the condition shown in FIG. 3 ensues, it is virtually impossible to introduce the worm wheel 22 into the worm 23, and damage to the toothing can occur if inappropriate actions are taken.

Figure 4:
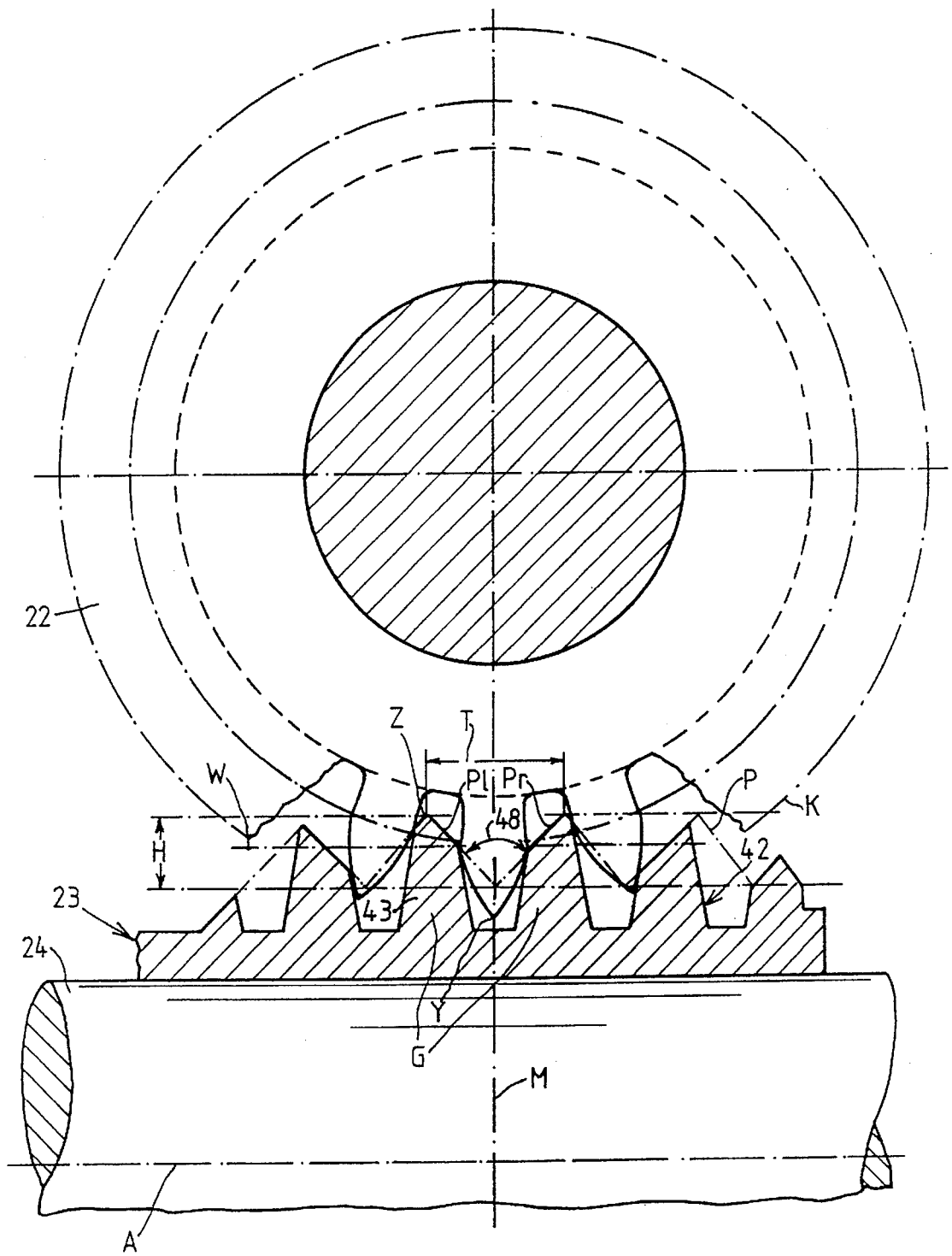
FIG. 4 is a view similar to FIG. 3 showing the worm wheel in engagement with the worm according to the invention.

FIG. 3 shows a superposition profile P according to the invention in phantom, which is superimposed on the profile of the thread of the worm. The end surface or blunt tip 45 of the worm thread 42 is over-rotated in such a way that the profile of the individual windings 43 of the worm 23 tapers to a point differently in each winding. Tips Z of the windings 43 of the worm as shown in FIG. 4 are each spaced apart by a distance T from one another that is equivalent to a spacing Tr of the tooth tips Y of the worm wheel 22 as shown in FIG. 3. The spacing Tr is equivalent to the pitch of the teeth at a circumference or tip circle K of the worm wheel 22. In terms of its pitch, the superposition profile P orients itself in accordance with the spacing of the tooth tips Y at the circumference of the worm wheel 22, or in other words in accordance with the pitch Tr of the worm wheel 22 at its tip circle K. A contouring of lateral surfaces or flanks 47 of the teeth of the worm thread 42 of the worm 23 is accomplished by way of example by plunge cutting into the worm, using a chisel on a lathe, in such a way that a middle worm winding G, in other words the worm winding in a center M of the worm, is given a symmetrical tooth profile that is constructed in mirror symmetry. It is advantageous if the entire superimposed profile removes a mirror-symmetrical contour from the worm thread in such a way that the worm windings adjacent the winding G in the center M of the worm are each in mirror symmetry given an asymmetrical tip. A plane of symmetry with the worm windings 42 that are vertically on a center line A of the drive shaft 24 is selected as the center M of the worm 23. An angle 48 between two profile surfaces Pl and Pr may be symmetrical with respect to the center line M of the worm 23, or may be asymmetrical so that one of the profile surfaces is smaller than the other. In the present exemplary embodiment, the profile surfaces Pl and Pr are of equal size, and the angle 48 is symmetrical. A profile height H of the superimposed profile P is chosen in such a way that in the center M of the worm, the two adjacent worm windings are removed only as far as the height to which an operating rolling circle W extends. Through the use of a different angle 48 between the profile surfaces Pl and Pr, a different profile shape of the two lateral surfaces 47 of the windings 43 of the worm thread 42 can be attained. Care must merely be taken to ensure that the spacing T of the tips Z of the windings 43 of the worm 23 are not smaller than the pitch Tr at the tips Y of the teeth 44 of the worm wheel 22.

It can be seen from FIG. 3 that in a worm 23 with the super-imposed profile P, no inhibition of the worm wheel 22 occurs as it plunges in the direction of the arrow E into the worm. The tips Y of the worm wheel 22 no longer strike the blunt end surfaces 45 of the windings 43 of the thread 42 of the worm 23, but rather strike either the profile surfaces Pl or the profile surfaces Pr. Should a tip Y of a tooth 44 of the worm wheel 22 meet a tip Z of a winding 43 of the worm 23, then despite the contact with one another they slide past one another because the tips each have a small radius. Particularly whenever the worm is in operation, the tips slide along one another because of the radii. The sliding tips Y of the teeth 44 of the worm wheel 22 then meet the obliquely extending profile surfaces Pl or Pr and thus slide into the thread of the worm. As a result, the worm wheel 22 and the worm 23 always enter into engagement regardless of how the tips Y of the teeth 44 of the worm wheel 22 meet the profile of the thread 42 of the worm.

FIG. 4 shows a worm having a thread 42 which has been machined with the aid of the superimposed profile P. The worm wheel 22 is in engagement. It can be seen clearly that the profile superposition is effected symmetrically with respect to the worm center M, so that at the point where the worm drives the worm wheel, the lateral surfaces or flanks 47 of the teeth of the windings 43 of the thread 42 of the worm have a sufficiently large load-bearing area. Toward the end of the worm 23, the height of the thread 42 decreases, even though the height H of the superimposed profile P remains the same. This facilitates the plunging of the worm wheel 22 into the worm 23.

I claim:

1. An open-end spinning apparatus in a spinning machine for continuous spinning of textile fibers, comprising:
   a spinning rotor having an axis;
   a cap covering said spinning rotor and being pivotably supported about a pivot axis oriented at right angles to the rotor axis;
   a delivery roller disposed in said cap for supplying textile fibers to said spinning rotor, said roller having a drive shaft;

a stationarily installed shaft extending longitudinally of the spinning machine for driving said roller;

a worm transmission driving said roller and having a driving worm on said stationarily installed shaft and a worm wheel with teeth on said drive shaft, said worm wheel meshing with and plunging into said driving worm upon closure of said cap;

said driving worm including at least one thread having adjacent windings with lateral surfaces, said lateral surfaces of said adjacent windings each tapering to a point; and two of said adjacent windings having tips spaced apart by a spacing great enough to cause at least one of said teeth of said worm wheel to be forced between two of said windings upon plunging into said driving worm, said teeth of said worm wheel having tips spaced apart by a given spacing along a tip circle, and said spacing between said tips of two adjacent windings being at most as great as said given spacing.

2. The open-end spinning apparatus according to claim 1, wherein said additional shaping is a profile superimposed upon a profile of said windings of said at least one thread having a pitch being equivalent to said given spacing.

3. The open-end spinning apparatus according to claim 2, wherein said windings of said at least one worm thread have a middle worm thread winding;

said profile of said additional shaping is superimposed in shifted fashion upon said profile of said windings of said at least one worm thread so that said adjacent windings of said middle worm thread winding each have a symmetrically constructed tip and profile surfaces facing one another being of equal size; and said worm thread windings adjacent said middle worm thread winding each have an asymmetrically constructed tip in mirror symmetry with one another.

4. The open-end spinning apparatus according to claim 2, wherein said driving worm has a center line, and said profile of said additional shaping has profile surfaces enclosing an angle between two of said profile surfaces being symmetrical with respect to the center line of said driving worm.

5. The open-end spinning apparatus according to claim 1, wherein said worm wheel plunges at least substantially vertically into said driving worm upon closure of said cap.

6. An open-end spinning apparatus in a spinning machine for continuous spinning of textile fibers, comprising:

a spinning rotor having an axis;

a cap covering said spinning rotor and being pivotably supported about a pivot axis oriented at right angles to the rotor axis;

a delivery roller disposed in said cap for supplying textile fibers to said spinning rotor, said roller having a drive shaft;

a stationarily installed shaft extending longitudinally of the spinning machine for driving said roller;

a worm transmission driving said roller and having a driving worm on said stationarily installed shaft and a worm wheel with teeth on said drive shaft, said worm wheel meshing with and plunging into said driving worm upon closure of said cap;

said driving worm including at least one thread having adjacent windings with lateral surfaces, said lateral surfaces of said adjacent windings each tapering to a point; and two of said adjacent windings having tips spaced apart by a spacing great enough to cause at least one of said teeth of said worm wheel to be forced between two of said windings upon plunging into said driving worm, wherein said windings of said at least one worm thread have a middle worm thread winding, said driving worm has an operational rolling circle, and said additional shaping has a profile with a height being selected in such a way that said lateral surfaces on said middle worm thread winding are removed at most as far as the operational rolling circle to form said tips of said windings.

* * * * *